W. BESCHKE.
Packings for Steam-Engines.
No. 146,122. Patented Jan. 6, 1874.
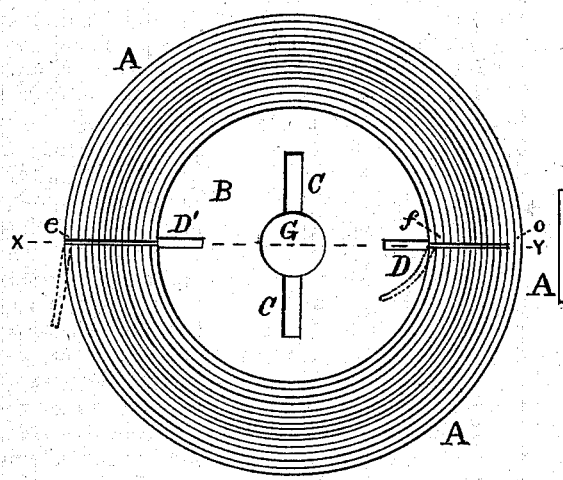
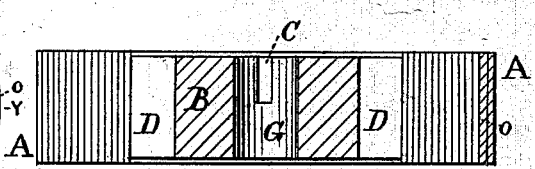
Witnesses.
H. A. Daniels
C. H. Isham
Inventor.
William Beschke
by his atty Geo. T. Buckley

UNITED STATES PATENT OFFICE.

WILLIAM BESCHKE, OF PHILADELPHIA, PENNSYLVANIA.

IMPROVEMENT IN PACKINGS FOR STEAM-ENGINES.

Specification forming part of Letters Patent No. 146,122, dated January 6, 1874; application filed August 21, 1873.

*To all whom it may concern:*

Be it known that I, WILLIAM BESCHKE, of the city of Philadelphia, State of Pennsylvania, have invented certain new and useful Improvements in Packing for Steam - Engines, Stuffing-Boxes, &c.; and I do hereby declare the following to be a full, clear, and exact description of the same.

My invention consists of a packing, for the purposes hereinafter named, in ring form, having, in combination with a cut from the inner to the outer circumference, to permit the ring to be slipped over the rod being packed, a second cut, (preferably directly opposite and directly in line with the first cut,) and passing from the inner circumference of the packing-ring nearly to the outer, so that the material thus left uncut will act as a hinge to permit the opening of the ring, and this without disturbing the positions of the various layers of material composing the packing.

In the drawings, Figure 1 is an elevation of my improved packing-ring, showing the block and grooves; Fig. 2, a cross-section of the same on the line X Y of Fig. 1.

A is the packing-ring, composed of various layers, preferably of fibrous material; B, the interior block; C, a simple recess for securing the block on the revolving spindle in constructing the packing-ring; D, the grooves extending from the periphery of the block B inwardly; e, the line of cut from the groove D' entirely through the ring A; f, the line of cut extending from groove D to within a short distance of the outer circumference of the packing-ring A; G, the center of block B.

To enable others skilled in the art to make and use my improved packing, I will describe its construction and the mode of application.

I prefer to make my packing of a fibrous band, say of cotton, which I saturate with a suitable lubricant, such as paraffine, wax, oil, tallow, powdered soap-stone, plumbago, or their equivalents, or a compound of any two or more of them, or the packing may be used advantageously without any lubricant whatever. The band is then rendered as compact and hard as possible, by being passed between two rolls. The presence of a lubricant possessing adhesive powers or qualities is here very advantageous, as it assists the fibers to retain their compressed or dense condition. The block B is then placed on a revolving spindle, turned by any suitable mechanism. The end of the braided band is then inserted into one of the grooves of the block B—say groove D. The block B is rigidly set upon the spindle, being secured in place by the shoulders of the spindle projecting into recess or groove C. As the spindle revolves, the band of braided fibrous material is fed to it under tension, to secure tight winding, the tension being accomplished by a weighted roll or wheel resting upon the band between the block B and the rolls, or by any other suitable and well-known mechanical arrangement for securing tension. The block is then revolved until the requisite thickness of fibrous material is wound upon it, when the band is cut, care being taken that the band does not unwind, and the block with the ring upon it is then removed from the spindle. A band is then passed around the outer periphery of the ring and tied. This band may be cord or wire. A knife is then inserted in groove D' and the bands or layers of fibrous material are cut to the outer circumference, as at e. The knife is then inserted at groove D, and the layers of fibrous material A are then cut from the groove D to the point O, or thereabout. The packing is then finished by extracting the two ends of the long band of fibrous material, viz., from the inner end of it to the nearest cut, as shown in dotted lines at D, and from the outer end of it to the nearest cut, as shown in dotted lines at e. The ring A then consists of a series of concentric layers.

The mode of applying my packing to the piston-rod of a steam-engine is as follows, viz: The outside cord or wire which confines the ring is first taken off, the block B is taken out, and the packing-ring is opened at e, the part left uncut at o acting in the capacity of a hinge, and the ring is clasped around the rod; and, if a stuffing-box is to be packed, ring after ring, such as shown at A, is added until the box is full.

The cylindrical block B may be made of any suitable material. I prefer wood, on account of its cheapness. And ring A may be made of flax, hemp, cotton, or any other desirable and suitable material, though I use cotton. I would also mention that the lines of the respective cuts e and f, instead of being in line from the center of the block, may be at any other angle to the chord of the arc of the outer circumference of the ring, which it now bisects, and at any other part or parts of the ring A, care being taken that the two cuts are not so close together as to prevent the ring from opening sufficiently to clasp the rod around which it is desired to be packed.

I shall file a subsequent application for a patent to cover the above-described process.

The packing is further strengthened, and the adhesion of the layers to each other is secured, by sewing the layers together with linen or other thread.

Having thus described my invention, what I claim as new, and desire to secure by Letters Patent, is—

In a packing in the form of a ring, the combination of a cut from the inner to the outer circumference, with a second cut passing from the inner circumference nearly to the outer, substantially as and for the purposes described.

Witnesses: WILLIAM BESCHKE.
WM. KIEHNER,
J. P. DELANEY.